(12) United States Patent
Meunier (10) Patent No.: US 11,208,960 B2
(45) Date of Patent: Dec. 28, 2021

(54) SYSTEM AND METHOD FOR CONTROL OF A GAS TURBINE ENGINE

(71) Applicant: PRATT & WHITNEY CANADA CORP., Longueuil (CA)

(72) Inventor: Gabriel Meunier, Saint-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 302 days.

(21) Appl. No.: 16/551,204

(22) Filed: Aug. 26, 2019

(65) Prior Publication Data
US 2019/0376452 A1 Dec. 12, 2019

Related U.S. Application Data

(63) Continuation of application No. 15/367,585, filed on Dec. 2, 2016, now Pat. No. 10,584,646.

(60) Provisional application No. 62/368,746, filed on Jul. 29, 2016.

(51) Int. Cl.
| F02C 9/28 | (2006.01) |
|---|---|
| F02C 7/232 | (2006.01) |
| F02C 9/26 | (2006.01) |
| F02C 3/10 | (2006.01) |

(52) U.S. Cl.
CPC ............... *F02C 9/28* (2013.01); *F02C 7/232* (2013.01); *F02C 9/263* (2013.01); *F02C 3/10* (2013.01); *F05D 2220/323* (2013.01); *F05D 2270/304* (2013.01); *F05D 2270/3015* (2013.01); *F05D 2270/335* (2013.01); *F05D 2270/704* (2013.01)

(58) Field of Classification Search
None
See application file for complete search history.

(56) References Cited

U.S. PATENT DOCUMENTS

| 4,693,077 | A | * | 9/1987 | Skarvan | .................... F02C 9/28 |
| | | | | | 123/436 |
| 5,189,620 | A | * | 2/1993 | Parsons | .................... G05B 7/02 |
| | | | | | 318/609 |
| 6,422,023 | B1 | | 7/2002 | Dudd, Jr. et al. | |
| 7,010,417 | B2 | | 3/2006 | Edwards, II et al. | |
| 7,051,535 | B2 | * | 5/2006 | Acker | .................... B64C 27/14 |
| | | | | | 60/803 |
| 8,099,227 | B2 | * | 1/2012 | Shafique | .................... F02C 9/28 |
| | | | | | 701/104 |
| 8,886,438 | B2 | | 11/2014 | Duke et al. | |
| 9,273,614 | B2 | * | 3/2016 | Martis | .................... F02C 9/28 |
| 9,382,010 | B2 | * | 7/2016 | Chen | .................... F01D 21/003 |
| 9,382,847 | B2 | * | 7/2016 | Ficklscherer | ........... F01D 25/04 |
| 9,476,360 | B2 | * | 10/2016 | Corpron | .................... B64C 27/04 |
| 9,488,054 | B2 | * | 11/2016 | Corpron | .................... F01D 5/12 |

(Continued)

*Primary Examiner* — Jason H Duger
(74) *Attorney, Agent, or Firm* — Norton Rose Fulbright Canada LLP (57) ABSTRACT

A method and system of controlling a turboprop engine are described. The method comprises obtaining a propeller speed and a pressure-based measurement signal from a torque pressure transducer coupled to the turboprop engine, determining an output power of the turboprop engine from the pressure-based measurement and the propeller speed, calculating a gas generator speed request based on an error between the output power and a reference power, determining a fuel flow command based on the gas generator speed request, and issuing the fuel.

20 Claims, 8 Drawing Sheets

(56) References Cited

U.S. PATENT DOCUMENTS

| | | | | |
|---|---|---|---|---|
| 9,494,085 B2* | 11/2016 | Cai | .......................... | F02C 3/10 |
| 10,040,565 B2* | 8/2018 | Looper | .................. | B64C 11/40 |
| 10,059,432 B1* | 8/2018 | Lisio | ...................... | B64C 11/50 |
| 10,113,487 B2* | 10/2018 | Cai | .......................... | F02C 9/54 |
| 2015/0113996 A1 | 4/2015 | Cai et al. | | |
| 2019/0309689 A1* | 10/2019 | Meisner | .................... | F02C 9/54 |
| 2019/0376452 A1* | 12/2019 | Meunier | ................... | F02C 9/28 |

* cited by examiner

SYSTEM AND METHOD FOR CONTROL OF A GAS TURBINE ENGINE

CROSS-REFERENCE TO RELATED APPLICATIONS

This application is a continuation of U.S. patent application Ser. No. 15/367,585 filed on Dec. 2, 2016, which claims the benefit of U.S. Provisional Patent Application No. 62/368,746 filed on Jul. 29, 2016, the contents of which are hereby incorporated by reference.

TECHNICAL FIELD

This disclosure relates generally to the operation of gas turbine engines and, more particularly, to systems and methods for control of the supply of fuel provided to gas turbine engines using electronic engine control systems.

BACKGROUND

Prior to the introduction of electronic engine control (EEC), gas turbine engines were equipped with hydromechanical control systems. The only way to control the power delivered to the output shaft was to link the power lever position to a requested gas generator shaft speed. These engine control systems were designed to regulate the gas generator shaft speed (Ng) by commanding the fuel flow to the combustor. Ng speed correlates to engine output shaft power. However, the Ng to power relationship is not a straightforward one and is also a function of the flight envelope as well as engine conditions.

Therefore, improvements are needed.

SUMMARY

In accordance with a first broad aspect, there is provided a method of controlling a turboprop engine. The method comprises obtaining a propeller speed and a pressure-based measurement signal from a torque pressure transducer coupled to the turboprop engine, determining an output power of the turboprop engine from the pressure-based measurement and the propeller speed, calculating a gas generator speed request based on an error between the output power and a reference power, determining a fuel flow command based on the gas generator speed request, and issuing the fuel flow command to fuel control components to control fuel to the turboprop engine.

In accordance with another broad aspect, there is provided a system for controlling a turboprop engine. The system comprises at least one processing unit and a non-transitory computer readable medium having stored thereon program code. The program code is executable by the at least one processing unit for obtaining a propeller speed and a pressure-based measurement signal from a torque pressure transducer coupled to the turboprop engine, determining an output power of the turboprop engine from the pressure-based measurement and the propeller speed, calculating a gas generator speed request based on an error between the output power and a reference power, determining a fuel flow command based on the gas generator speed request, and issuing the fuel flow command to fuel control components to control fuel to the turboprop engine.

In a further aspect, there is provided a non-transitory computer-readable storage medium having stored thereon computer-executable instructions that, when executed by at least one processor, cause the at least one processor to perform the methods as described herein.

DESCRIPTION OF THE DRAWINGS

Reference is now made to the accompanying figures in which.

DETAILED DESCRIPTION

Various aspects of embodiments of systems, devices, and methods in accordance with the disclosure are described with reference to the drawings, which illustrate example embodiments.

Figure 1:
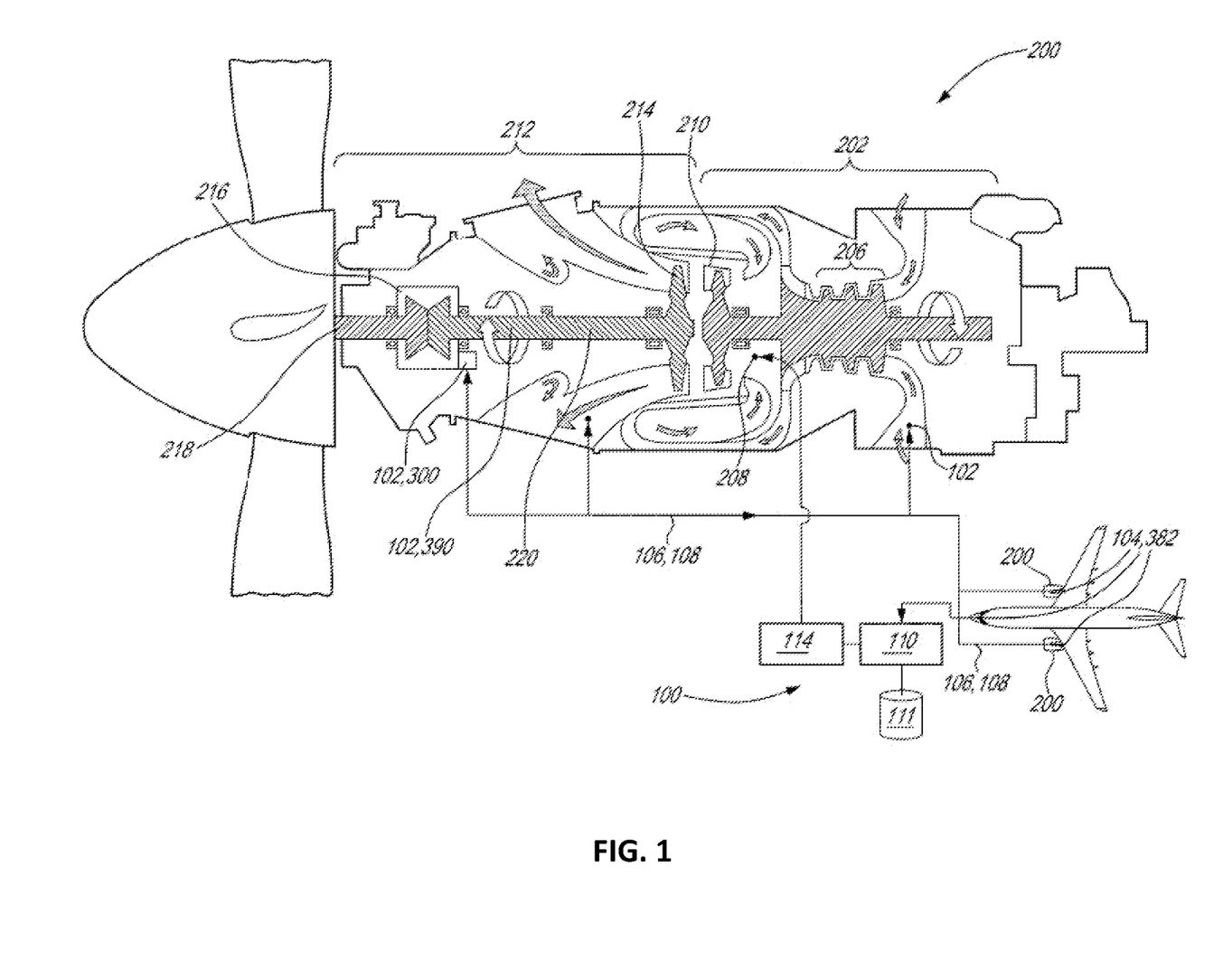
FIG. 1 is a schematic diagram of an example engine having a system for controlling a fuel supply.

FIG. 1 is a schematic diagram of a system 100 for controlling a fuel supply for an engine 200. In the example shown, turbine engine 200 is a turboprop engine suitable for use in providing primary flight power for an aircraft. In the example, engine 200 comprises a gas generator section 202 and a power module 212. Gas generator section 202 includes an accessory gearbox (not shown), a multi-stage compressor 206, a reverse-flow combustor 208, and a high-pressure compressor turbine 210. In the example shown, power module 212 comprises power turbine 214 (which may be multi-stage) and reduction gearbox (RGB) 216 for stepping down the rotational speed of turbine shaft 220 to a speed appropriate for driving a propeller shaft.

The operation and interactions of components 202-220 of engine 200 and other engines suitable for use in implementing systems, devices and methods according to aspects described herein will be well understood by those skilled in the art. As will be further understood by those skilled in the art, the systems and methods described herein are suitable for use in controlling fuel supplies for a wide variety of both turbine and non-turbine engines in addition to those described herein.

In a gas turbine engine such as a turboprop engine 200 or a turboshaft engine, engine output power is generally dependent on the rotational speed of gas generator shaft 220 (among other factors). Controlling the speed of a gas generator such as that of gas generator section 202, and therefore gas generator shaft 220 of FIG. 1, can be accomplished by regulating the amount of fuel supplied to the combustion chamber (e.g. combustor 208 of FIG. 1) in view of other factors such as altitude, inlet pressure, and inlet temperature.

In systems and methods described herein, the amount of fuel provided to a combustor (or other fuel injection system), and thereby the engine output power, can be regulated by an electronic engine control (EEC) 110 system, such as a Full-Authority Digital Electronic Control (FADEC) system. Such EECs 110 can use any one or more of a number of engine parameters as inputs in determining the amount of fuel to be supplied to the combustor in order to achieve or maintain a desired engine power output. Examples of such parameters include current output power, altitude, inlet and outlet air pressures, and inlet and outlet air temperatures.

As shaft output power can be expressed as the product of the shaft torque and the propeller speed, primary desirable factors in controlling fuel supply can include propeller speed ($N_p$) and other variables that are directly proportional to shaft torque, such as differential engine oil pressure measured across the reduction gearbox in a turboprop and/or stress and/or strain in the shaft. Thus, primary input sources for use by EEC 110 in determining current or desired output power, and thereby desired fuel flow, can include, for example, torque.

Thus, as described below, system 100 for controlling the fuel supply to engine 200 includes one or more automatic data processors (e.g. an EEC) 110 and one or more sensors and other input devices 102, 104 for assessing and/or confirming engine output power levels, for calculating desired fuel flow rates for the engine 200, and for issuing fuel flow commands to metering valves of fuel pumps and/or other fuel control components 114 to cause such calculated desired fuel flow rates to be provided to the engine.

Input sensors 102 may be provided for acquiring measurements representing engine output power or useful in determining engine output power. Such measurements may correspond to direct measures of output power (as in the case of differential oil pressures and/or propeller speed indicators), or indirect measures which may be used to deduce output power.

Input sensors 104 can be provided to acquire measurements relevant to engine operation or otherwise useful in confirming the current output power. For example, the measurements may be indirectly associated with engine performance, and/or used to confirm conditions in which an engine 200 is operating. These measurements may be used to confirm the output readings of one or more transducers 102, and thereby confirm current and desired engine output and fuel supply settings. Examples of measurements that can be acquired by sensors 104 and that can be used to confirm a primary engine power output indication include vertical or other accelerations at the engine location, main oil pressure (MOP), which can for example be affected by aircraft accelerations, and/or the rotational speed $N_g$ of the gas generator, e.g. section 202 in FIG. 1. While MOP and accelerometer readings can be used to acquire information regarding movement of the aircraft or other vehicles in which an engine is mounted, factors such as the rotational speed of the gas generator $N_g$ can be used to confirm whether in fact a significant change in engine operation has occurred.

Figure 2:
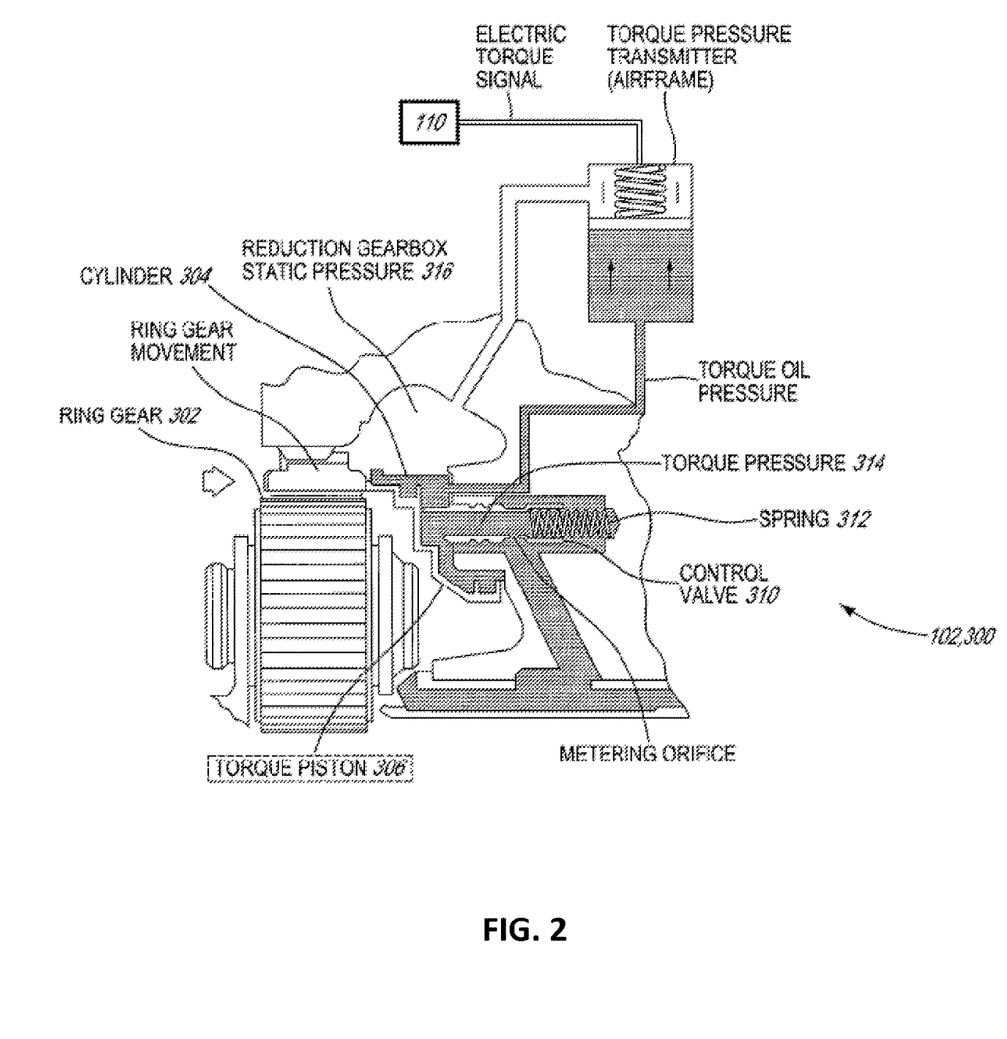
FIG. 2 is schematic diagram of an example differential oil pressure transducer.

In the example shown in FIG. 1, system 100 for controlling the fuel supply of engine 200 includes an engine output power transducer 102 in the form of a differential oil pressure transducer 300 such as, for example, that shown schematically in FIG. 2. In some embodiments, the differential oil pressures provided by transducer 102, 300 can be used to provide a measure of the output torque (Q) of engine 200, which is directly proportional to the engine output power.

Operation of an embodiment of a fuel control system 100 as described herein is described in conjunction with a differential oil pressure transducer 102, 300, although a person skilled in the art will appreciate that other measures of engine torque can be used as input sources.

In some embodiments, systems and methods described herein can be applied to an engine having a differential oil pressure transducer 120, 300 and no other sensor for providing engine torque information. For example, an older engine, which may not have a torque shaft sensor that can directly read engine torque, can be retrofitted or modified with a controller and/or aspects of the systems described herein to utilize the differential oil pressure transducer signals.

In the example shown in FIGS. 1 and 2, differential oil pressure transducer 102, 300 can be disposed proximate to a first stage reduction gear of reduction gearbox 216, and can include a ring gear 302, cylinder 304, piston 306 connected to valve 310, and spring 312. Rotation of ring gear 302 can be resisted by helical splines, which can impart an axial movement of the ring gear and to piston 306. Movement of piston 306 can cause valve 310 to move against spring 312, opening a valve orifice and allowing flow of pressurized oil into torque pressure chamber 314. Movement of piston 306 can continue until the pressure of oil in chamber 314 is proportional to the torque being transmitted to ring gear 302. Because external pressure can vary and can affect the total pressure applied to piston 306, the internal reduction gearbox static pressure applied at chamber 316 can be applied to the reverse side of piston 306, resulting in measurement of differential oil pressure in the reduction gearbox 216. This reduction gearbox differential pressure can be interpreted as a measure of torque applied to output shaft 218 by the reduction gearbox 216, and therefore can be used as a control parameter in determining and controlling the amount of fuel supplied to engine 200.

During some situations (such as low-G conditions), a torque pressure-transducer may not output a signal, or may potentially incorrectly indicate a large change in torque pressure.

As will be understood by those skilled in the art, transducers 102, including any transducers 300, can be of any suitable form for accomplishing the purposes described herein. The arrangement shown in FIG. 2 is merely an example of a single type of transducer that can be used in implementing the methods, systems and devices described herein.

Figure 3:
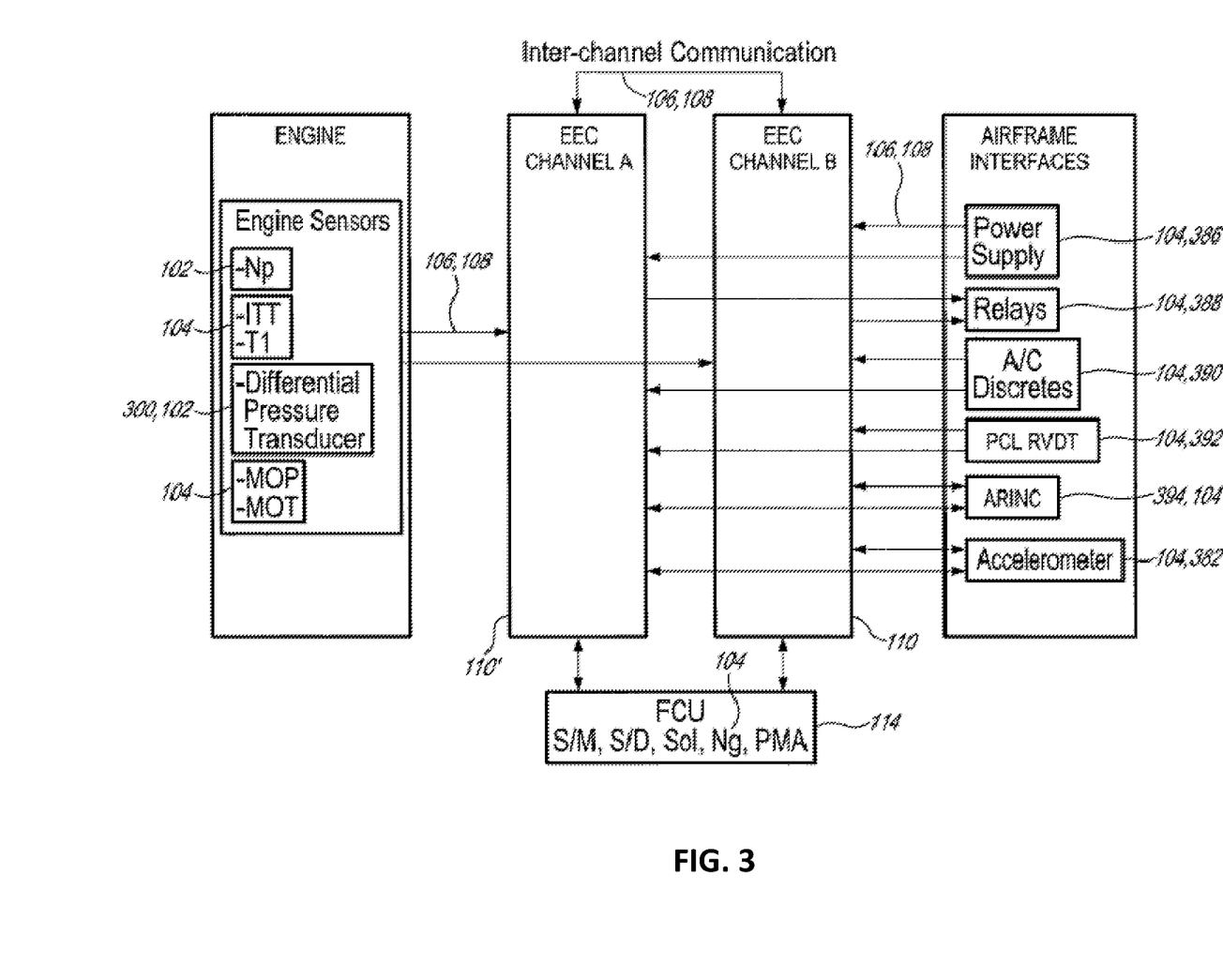
FIG. 3 is a schematic diagram of an example system for controlling a fuel supply for an aircraft-mounted turbine engine.

FIG. 3 is a schematic diagram of an example system for controlling a fuel supply for an aircraft-mounted turbine engine. The system is suitable for use, for example, in controlling a fuel supply for an engine 200 such as that shown in FIG. 1. The system comprises one or more sensors 102 for reading and transducing engine operating parameters such as, for example, differential oil pressure (see, for example, sensor 300 of FIGS. 1 and 2), propeller speed $N_p$, and shaft torque (not shown). The system can further include one or more sensors 104 for reading and transducing other parameters associated with operation of the engine 200 such as, for example, main oil pressure MOP, main oil temperature MOT, and other parameters such as power supply output 386, relay status 388, A/C discretes 390, cockpit power control lever 392 (e.g. power control lever rotary variable differential transformer PCL RVDT), and other avionics devices 394. One or more communications channels 106, 108, such as digital buses, electronic engine controls (EECs) 110, 110' and fuel control units (FCUs) 114 are also provided. In the example shown, redundant EECs 110, 110' are provided.

As will be understood by those skilled in the art, the various components of the system of FIG. 3 may be implemented separately or jointly, in any form or forms suitable for use in implementing the systems, devices and methods described herein. For example, sensors 102, 104 for reading and transducing engine operating parameters such as differential oil pressure, shaft stress and/or strain, compressor inlet pressure, propeller speed Np, inter turbine temperature ITT, compressor inlet temperature T1 or outlet temperature, main oil pressure MOP, and/or main oil temperature MOT may be of any mechanical, hydraulic, electrical, magnetic, analog and/or digital compatible forms suitable for use in implementing desired embodiments of the systems, devices and methods described herein. For example, as shown in FIG. 2, a pressure transducer such as differential oil pressure transducer 300 may provide mechanical/visual output for full or partial manual control of a turbine engine. In other embodiments, temperature, pressure, or other sensors providing digital and/or analog electromagnetic and/or mechanical signals may be used. Many suitable types of transducers are known, and others may be developed hereafter.

Communications channels 106, 108, such as those between sensors 102, 104 and EEC 110 can include any single or redundant communications devices or systems, including for example dedicated, direct-wire connections, serial or parallel buses, and/or wireless data communications components, suitable for accomplishing the purposes described herein. As will be understood by those skilled in the art, it can be desirable in some applications, particularly in aerospace applications, to provide sensors 102, 104, communications channels 106, 108, processors 110, and fuel control units (FCUs) 114 in redundant sets, particularly with respect to devices which generate, transmit or process electrical signals.

Fuel control unit (FCU) 114 may include any relays, switches, and controls, and/or other components, such as pump and/or valve controls required to control fuel supply at the command of EEC 110, as for example by receiving and appropriately responding to command signals provided by the EEC and configured to provide a desired fuel flow to engine 200.

EECs 110, 110' may include any single, multiple, combination, and/or redundant general or special purpose data processors, such as printed integrated circuit boards and associated or auxiliary components such as volatile and/or persistent data storage devices 111, relays, and input/output devices, suitable for accomplishing the purposes described herein. Such components may include any hardware and/or software and/or firmware and data sets, suitable for use in implementing the systems, devices and methods disclosed herein.

As one example, software contained in the EEC 110 and executed in processors associated therewith may include filters to condition the differential oil pressure signal as required. Noise may be present in the signal due to various phenomena that may appear in the signal at various frequencies. For example, since the differential pressure oil transducer 300 is located above the reduction gearbox 216 in close proximity to the propeller, the differential oil pressure transducer 300 may respond to the frequency with which propeller blades pass the transducer. Pulses within the signal related to such phenomena could be filtered via software to ensure the EEC 110 is processing a true output power or torque signal.

Figure 4:
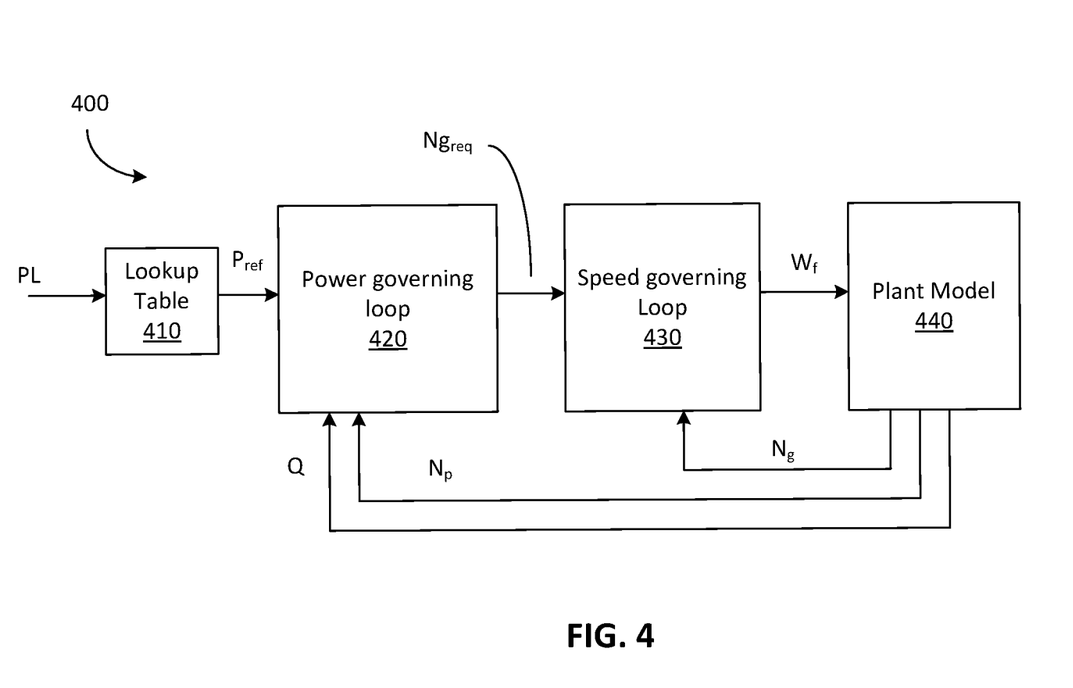
FIG. 4 is a simplified block diagram of an example system for controlling a fuel supply for an aircraft-mounted turbine engine.

FIG. 4 is a simplified block diagram of an example system 400 for controlling output power for an aircraft-mounted turbine engine. Output power is controlled through fuel flow regulation. System 400 includes a lookup table 410, a power governing loop 420, and a speed governing loop 430. Plant model 440 is outside of system 400 and represents the engine 200. In some embodiments, system 400 is implemented within EEC 110. The power governing loop 420 may be referred to as an outer control loop, the speed governing loop 430 may be referred to as an inner control loop.

As depicted in FIG. 4, lookup table 410 is operable to receive a signal (PL) from the power control lever 392 and determine a corresponding reference power ($P_{ref}$). In some embodiments, lookup table 410 is a multi-dimensional lookup table. Prior to the introduction of electronic engine control systems, power delivered to the output shaft of engine 200 could be controlled by linking the power control lever position to a requested gas generator speed, which has a correlation with engine output power. However, the correlation between gas generator speed and output power is not straightforward and depends on a host of factors (e.g. engine load, altitude, temperature, or the like). As such, controlling engine output power using only the power lever signal may be imprecise and requires recurrent adjustments of the power lever by the pilot.

Power governing loop 420 is operable to accept as inputs the reference power $P_{ref}$, as well as a signal from the differential oil pressure transducer 102, 300 representative of output torque (Q), and propeller speed $N_p$. Using these three inputs, the power governing loop 420 is operable to determine a requested gas generator speed ($Ng_{req}$).

Speed governing loop 430 is operable to accept the requested gas generator speed from power governing loop 420, as well as the gas generator speed $N_g$ from engine 200. The speed governing loop 430 is operable to determine a fuel flow command to control engine speed Ng. In some embodiments, the fuel flow command is sent to fuel control unit 114.

Figure 5:
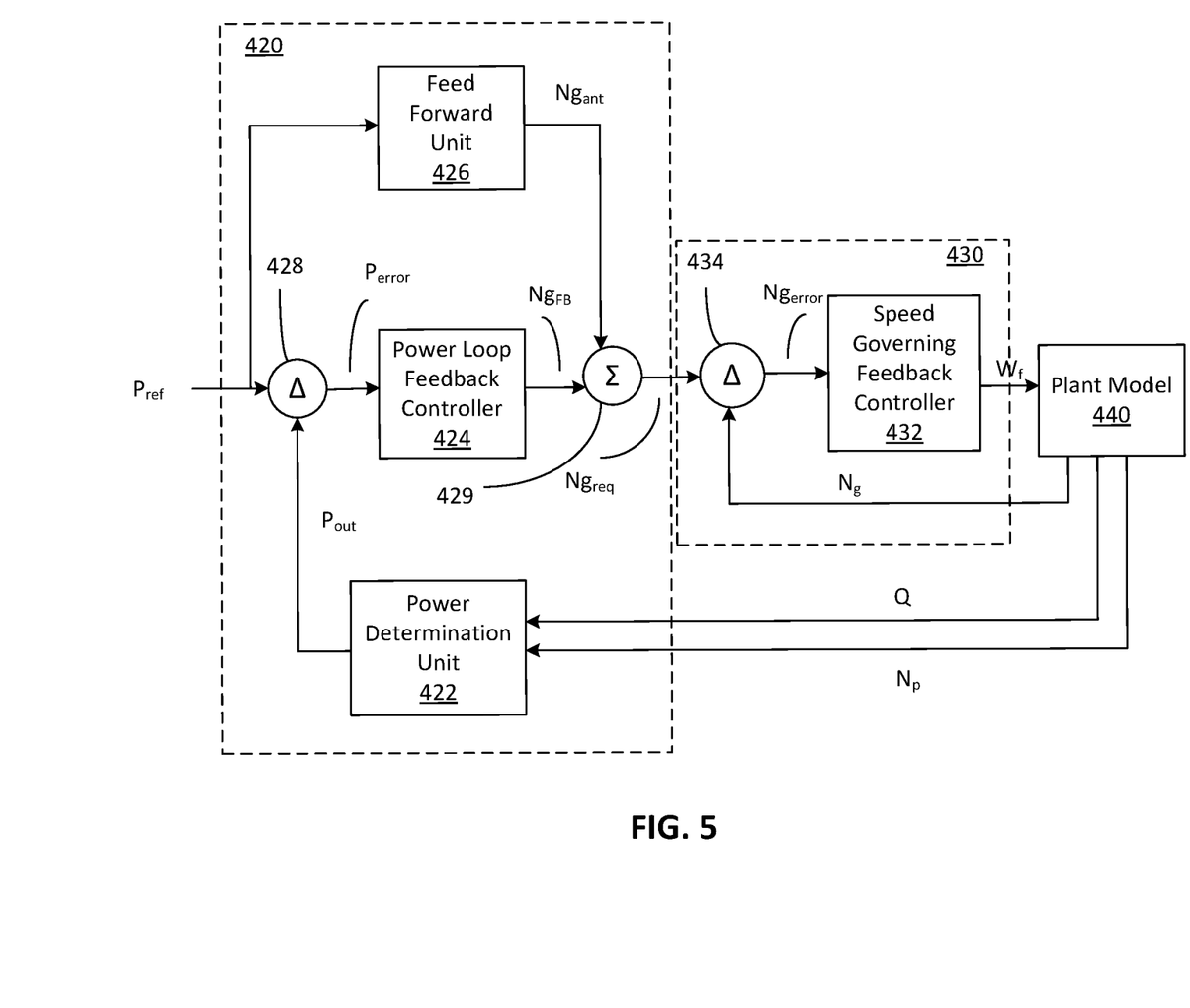
FIG. 5 is a block diagram showing an expanded view of some of the components in FIG. 4.

FIG. 5 is a block diagram showing an expanded view of some of the components in system 400. As depicted, power governing loop 420 includes power determination unit 422, power loop feedback controller 424, feed forward unit 426, subtraction unit 428, and addition unit 429.

Power determination unit 422 is operable to accept the torque Q and the output propeller speed $N_p$ to determine an output power ($P_{out}$) of the engine 200. The difference between $P_{ref}$ and $P_{out}$ is taken at subtraction junction 428, and this difference ($P_{error}$) is sent to power loop feedback controller 424. Power loop feedback controller 424 determines a gas generator feedback speed parameter ($Ng_{FB}$) based on the $P_{error}$ parameter. In some embodiments, power loop feedback controller 424 is a proportional-integral controller.

In addition to determining gas generator feedback speed $Ng_{FB}$, the reference power $P_{ref}$ is also sent to feed forward module 426, which determines an anticipated gas generator speed $Ng_{ant}$ based on the reference power $P_{ref}$ (which is determined based on the PL signal from the power control lever 392).

The anticipated gas generator speed $Ng_{ant}$ and the gas generator feedback speed $Ng_{FB}$ are then summed at addition junction 429 to produce a requested generator speed ($Ng_{req}$). A person skilled in the art will appreciate that in the embodiments described herein, the requested generator speed is a function of both the output of power loop feedback controller 424, as well as the output of feed forward unit 426.

The requested generator speed $Ng_{req}$ is then sent to speed governing loop 430, where the difference between the requested generator speed $Ng_{req}$ and the current measured generator speed Ng is taken at subtraction junction 434. The difference between $Ng_{req}$ and Ng is referred to herein as the gas generator speed error ($Ng_{error}$) and is sent to speed governing feedback controller 432, which determines a fuel flow command $W_f$ based on the gas generator speed error $Ng_{error}$. The fuel flow command is then sent to fuel control unit 114.

Figure 6:
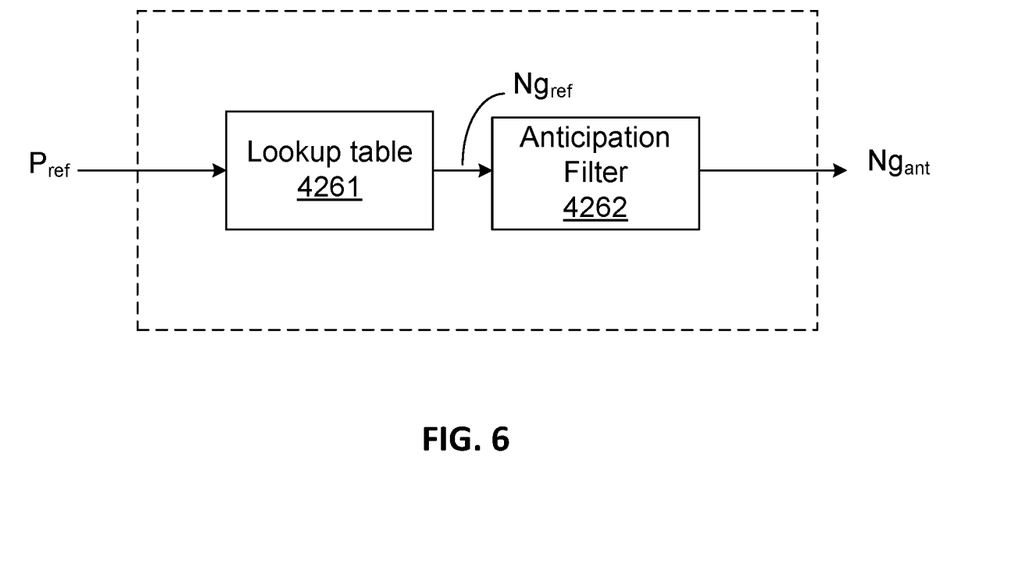
FIG. 6 is a block diagram showing an expanded view of the feed forward unit in FIG. 5.

FIG. 6 is a block diagram showing an expanded view of the feed forward unit 426. Feed forward unit 426 includes lookup table 4261 and anticipation filter 4262. The lookup table 4261 is operable to receive a reference power $P_{ref}$ and determine a steady-state generator speed $Ng_{SS}$ associated with the reference power $P_{ref}$. The anticipation filter is operable to receive the steady-state generator speed $Ng_{SS}$ and determine an anticipated generator speed $Ng_{ant}$. In some embodiments, the anticipation filter 4262 is a first-order filter.

Figure 7:
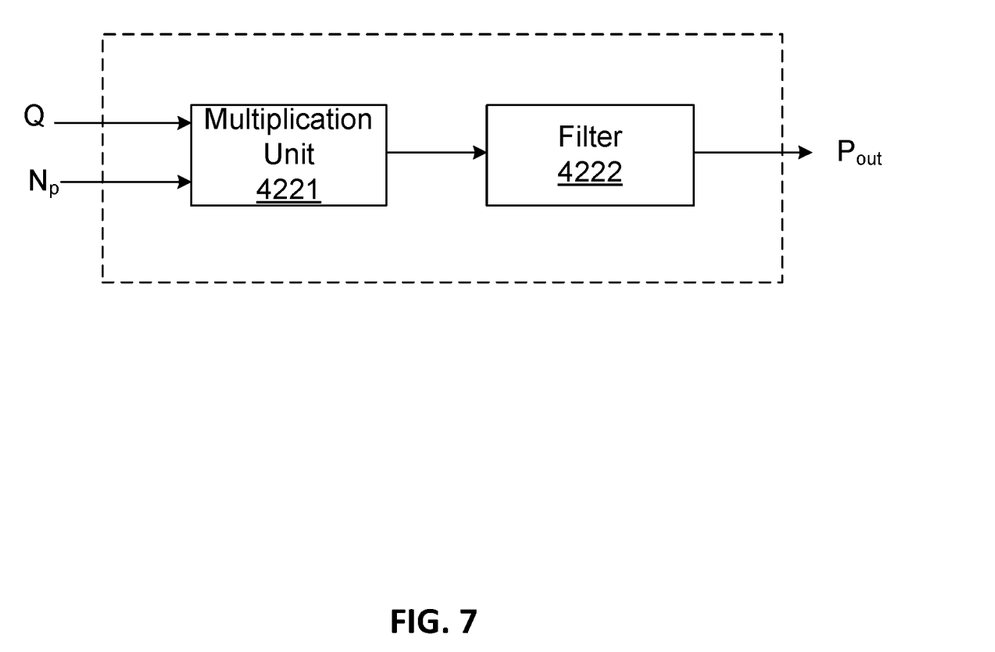
FIG. 7 is a block diagram showing an expanded view of the power determination unit shown in FIG. 5.

FIG. 7 is a block diagram showing an expanded view of the power determination unit 422. Power determination unit 422 includes multiplication unit 4221 and filter 4222. Multiplication unit 4221 is operable to receive torque Q and propeller speed Np and calculate a product. The product of torque and propeller speed is then filtered by filter 4222 to output the output power $P_{out}$.

Figure 8:
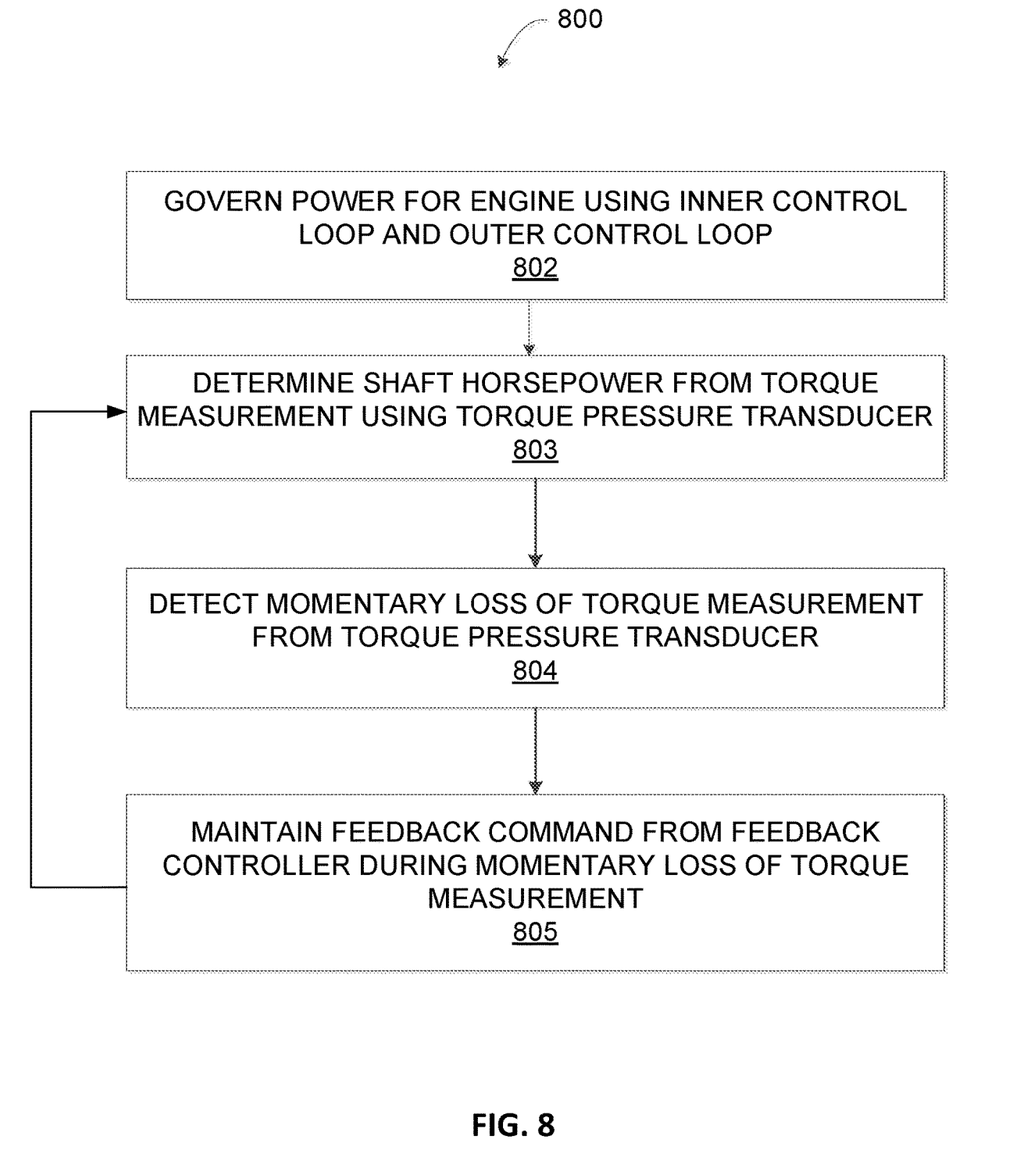
FIG. 8 is a flow chart illustrating an example method for controlling a fuel supply for an aircraft-mounted turbine engine.

FIG. 8 is a schematic flow diagram of an example method 800 for controlling a fuel supply for an aircraft-mounted turbine engine. Method 800 is suitable for use in conjunction with system 400 in implementing controls for fuel supplies for engines such as engine 200 in FIG. 1.

Method 800 depicts a method to accommodate for momentary loss of torque signal and minimize impacts on the different governing loops. During certain maneuvers of an aircraft or other vehicle, such as a zero-g or low-g aircraft operation (which may be encountered during turbulence or in sudden descents), acceleration of oil within the oil tank may cause an incorrect oil pressure reading. The incorrect oil pressure reading can result in an incorrect indication of a torque or output power change if differential oil pressure is being used to measure output torque. For example, oil may be accelerated away from the bottom of the tank where the oil pump is located, causing the oil pump to cavitate, with a consequent drop in main oil pressure (MOP). Such a drop in MOP can in turn result in a loss of differential oil pressure which is not necessarily associated with a change in torque or output power.

Alternatively, an error in the torque signal and corresponding output power signal can be detected by directly monitoring the MOP, as a sudden drop in the MOP would suggest that a drop in the torque signal from the differential oil pressure transducer 102, 300 would be occurring. As a further alternative, an error in the torque signal can be detected by monitoring the rate of change of the differential oil pressure or output torque parameter itself. A high negative rate of change would suggest that the differential oil pressure transducer 102, 300 is experiencing a momentary loss of torque signal.

Determining whether a change in torque or output power actually occurred can be useful, for example, when no change in power setting is desired, as for example where a FADEC or other system is configured to provide a desired constant power output. To change the fuel flow to the engine when, for example, no change is necessary to maintain a level of output power, could cause inefficient or inappropriate changes in actual engine power output.

Determining whether a change in torque or output power actually occurred can also be useful where, for example, a desired change in engine power has been requested, but subsequent changes in aircraft operating conditions cause an apparent change in engine power output that is not accurate.

A number of other parameters may also be monitored to determine whether a change in differential oil pressure (and consequently, torque and output power) detected at 804 is due to aircraft operations rather than a change in output power. For example, one or more locations on the aircraft can be equipped with one or more accelerometers 104, 382 (e.g. in FIGS. 1 and 2), which would provide various components of aircraft vertical, horizontal, and rotational acceleration to EEC 110 or other flight control computers.

At 802, power is governed for the engine using a control structure as described above and as illustrated in FIGS. 4 to 7. More specifically, the control structure comprises an inner control loop and an outer control loop. The outer control loop has a feedback controller, such as feedback controller 424, that outputs a feedback command based on a power error determined as a function of a shaft horsepower. The feedback command is used to determine a gas generator speed error, and the gas generator speed error is used by the inner control loop for outputting a fuel flow command.

At 803, the shaft horsepower is determined from the torque measurement of the engine using a torque pressure transducer. This is illustrated, for example, in FIG. 5 where measurement Q is provided to power determination unit 422. At 804, a momentary loss of the torque measurement from the torque pressure transducer is detected. In response, at 805, power fluctuations due to the loss of torque measurement are limited by maintaining the feedback command from the feedback controller constant during the momentary loss of torque measurement.

Once it has been determined that an error in the output power or torque signal has occurred, as per 804, a corrected fuel flow is calculated. The corrected fuel flow can be calculated, for example, by holding the output parameter ($Ng_{FB}$) of first feedback controller 424 constant at the last rate prior to the detection of the error in the torque or output power. While the output of first feedback controller 424 is held constant, the power governing loop 420 continues to receive the reference power parameter ($P_{ref}$) based on the position of the power lever 392, which continues to be converted to an anticipated gas generator speed parameter ($Ng_{ant}$) by feed forward module 426. $Ng_{ant}$ and $Ng_{FB}$ are then summed to obtain the requested generator speed parameter $Ng_{req}$.

It should be appreciated that although the output of first feedback controller 424 is constant, the requested gas generator speed parameter $Ng_{req}$ is not held constant, as the anticipated gas generator parameter $Ng_{ant}$ is still being fed forward. The $Ng_{req}$ parameter is then used in fuel flow regulating loop 430 to determine a corrected fuel flow rate. The corrected fuel flow rate can then be used to generate and send a corrected fuel flow command $W_f$ to the FCU 114.

In some embodiments, the output of first feedback controller 424 is held constant for a predefined period of time. Such a predefined time period would be long enough to allow the trigger condition to subside, but in any case would be short enough to prevent the development of other possibly detrimental changes in flight or other vehicle conditions. For example, in the event that a momentary loss of main oil pressure is experienced, and a corresponding loss of differential oil pressure also occurs, at 805 the first feedback controller 424 output may be held for a period of time long enough to give both the MOP and the differential oil pressure a chance to stabilize, so long as no danger to flight safety has a chance to arise.

In some embodiments, the output of first feedback controller 424 may be held constant until such a point in time at which a detected parameter (e.g. the MOP pressure or the rate of change of the differential oil pressure or torque) is determined to have stabilized.

Figure 9:
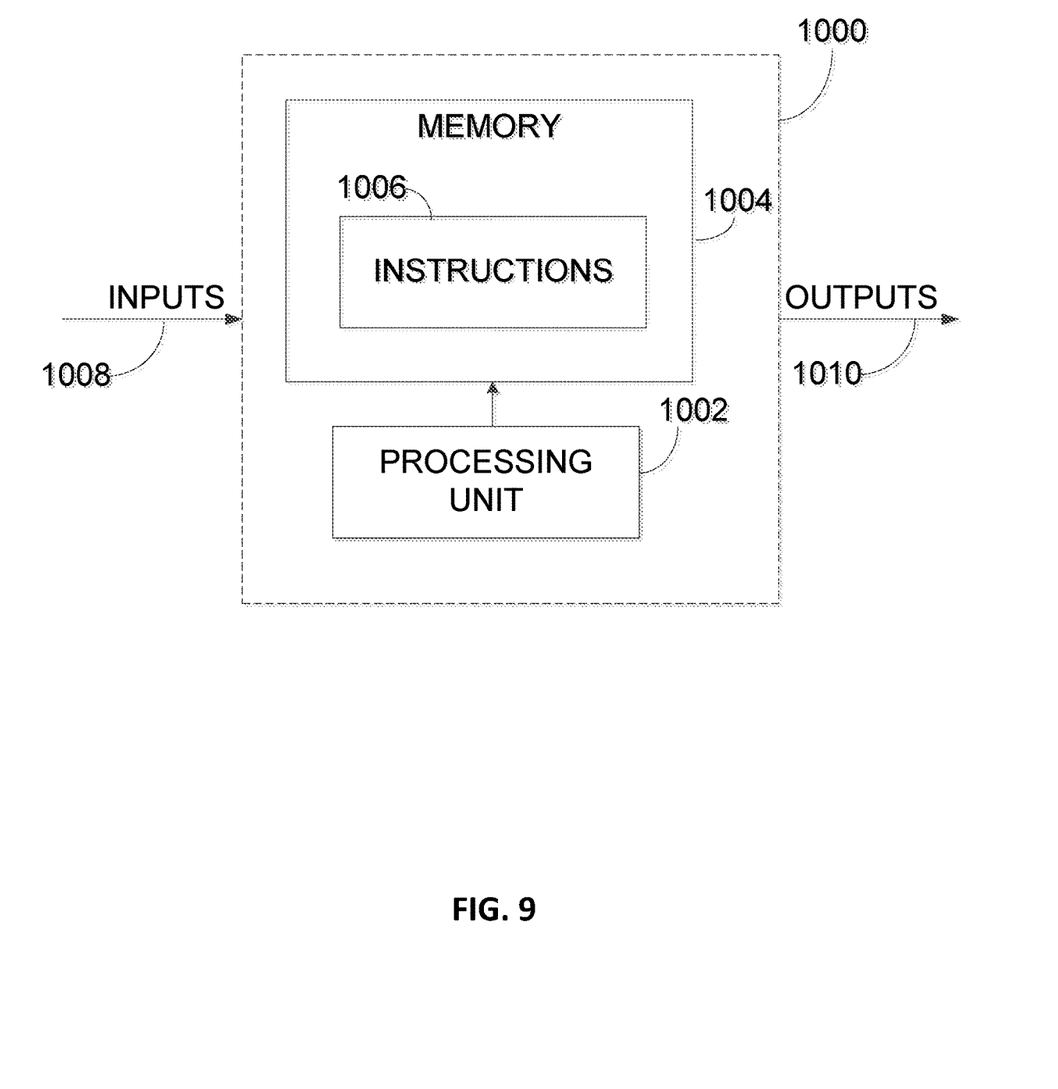
FIG. 9 is a block diagram of an example computing device to implement the method of FIG. 8.

FIG. 9 shows a schematic representation of the EEC 110, as a combination of software and hardware components in a computing device 1000. The computing device 1000 may comprise one or more processing units 1002 and one or more computer-readable memories 1004 storing machine-readable instructions 1006 executable by the processing unit 1002 and configured to cause the processing unit 1002 to generate one or more outputs 1010 based on one or more inputs 1008. The inputs may comprise one or more signals representative of a differential oil pressure of the engine, a reference power parameter, and a trigger condition. The outputs 1010 may comprise one or more signals representative of the commanded fuel flow rate and the updated fuel flow rate.

Processing unit 1002 may comprise any suitable devices configured to cause a series of steps to be performed by computing device 1000 so as to implement a computer-implemented process such that instructions 1006, when executed by computing device 1000 or other programmable apparatus, may cause the functions/acts specified in method 800 to be executed. Processing unit 1002 may comprise, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 1004 may comprise any suitable known or other machine-readable storage medium. Memory 1004 may comprise non-transitory computer readable storage medium such as, for example, but not limited to, an electronic, magnetic, optical, electromagnetic, infrared, or semiconductor system, apparatus, or device, or any suitable combination of the foregoing. Memory 1004 may include a suitable combination of any type of computer memory that is located either internally or externally to computing device 1000 such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 1004 may comprise any storage means (e.g. devices) suitable for retrievably storing machine-readable instructions 1006 executable by processing unit 1002.

Various aspects of the present disclosure may be embodied as systems, devices, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g., memory 1004) having computer readable program code (e.g., instructions 1006) embodied thereon. The computer program product may, for example, be executed by a computer to cause the execution of one or more methods disclosed herein in entirety or in part.

Computer program code for carrying out operations for aspects of the present disclosure in accordance with instructions 1006 may be written in any combination of one or more programming languages, including an object oriented programming language such as Java, Smalltalk, C++ or the like and conventional procedural programming languages, such as the "C" programming language or other programming languages. Such program code may be executed entirely or in part by a computer or other data processing device(s). It is understood that, based on the present disclosure, one skilled in the relevant arts could readily write computer program code for implementing the methods disclosed herein.

The systems and methods described herein may enhance the steadiness of engine power tracking during a momentary loss of torque signal during certain aircraft operating conditions (e.g. low-g operation). The systems and methods described herein may also limit the power fluctuations due to the loss of torque signal during these conditions, which may result in a reduced or minimized thrust disturbance at the aircraft level during such conditions.

The above descriptions are meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method of controlling a turboprop engine, the method comprising:
   obtaining a propeller speed and a pressure-based measurement signal from a torque pressure transducer coupled to the turboprop engine;
   determining an output power of the turboprop engine from the pressure-based measurement and the propeller speed;
   calculating a gas generator speed request based on an error between the output power and a reference power;
   determining a fuel flow command based on the gas generator speed request; and
   issuing the fuel flow command to fuel control components to control fuel to the turboprop engine.

2. The method of claim 1, wherein the gas generator speed request is calculated by an outer control loop and the fuel flow command is determined by an inner control loop of a control structure.

3. The method of claim 1, wherein the torque pressure transducer is a differential oil pressure transducer.

4. The method of claim 1, wherein the torque pressure transducer obtains the pressure-based measurement signal across a reduction gearbox of the engine.

5. The method of claim 1, wherein the method is performed by an electronic engine control (EEC).

6. The method of claim 5, wherein the torque pressure transducer is connected to the EEC.

7. The method of claim 1, further comprising filtering the pressure-based measurement signal as obtained from the torque pressure transducer.

8. The method of claim 7, wherein filtering the pressure-based measurement signal comprises removing frequencies corresponding to propeller blades passing the torque pressure transducer.

9. The method of claim 1, wherein the reference power for the engine is based on a position of a power lever.

10. The method of claim 1, further comprising detecting a momentary loss of the pressure-based measurement signal from the torque pressure transducer and maintaining a feedback command from a feedback controller during the momentary loss.

11. A system for controlling a turboprop engine, the system comprising:
at least one processing unit; and
a non-transitory computer readable medium having stored thereon program code executable by the at least one processing unit for:
obtaining a propeller speed and a pressure-based measurement signal from a torque pressure transducer coupled to the turboprop engine;
determining an output power of the turboprop engine from the pressure-based measurement and the propeller speed;
calculating a gas generator speed request based on an error between the output power and a reference power;
determining a fuel flow command based on the gas generator speed request; and
issuing the fuel flow command to fuel control components to control fuel to the turboprop engine.

12. The system of claim 11, wherein the gas generator speed request is calculated by an outer control loop and the fuel flow command is determined by an inner control loop of a control structure.

13. The system of claim 11, wherein the torque pressure transducer is a differential oil pressure transducer.

14. The system of claim 11, wherein the torque pressure transducer obtains the pressure-based measurement signal across a reduction gearbox of the turboprop engine.

15. The system of claim 11, wherein the system is an electronic engine control (EEC).

16. The system of claim 15, wherein the torque pressure transducer is connected to the EEC.

17. The system of claim 11, wherein the program code is further executable for filtering the pressure-based measurement signal as obtained from the torque pressure transducer.

18. The system of claim 17, wherein filtering the pressure-based measurement signal comprises removing frequencies corresponding to propeller blades passing the torque pressure transducer.

19. The system of claim 11, wherein the reference power for the engine is based on a position of a power lever.

20. The system of claim 11, wherein the program code is further executable for detecting a momentary loss of the pressure-based measurement signal from the torque pressure transducer and maintaining a feedback command from a feedback controller during the momentary loss.

* * * * *